United States Patent [19]

Malkani et al.

[11] 4,085,496

[45] Apr. 25, 1978

[54] MANUFACTURE OF METALLIC STRIP

[75] Inventors: Dalip T. Malkani; Andrew Middlemiss, both of Sheffield, England

[73] Assignee: British Steel Corporation, London, England

[21] Appl. No.: 755,060

[22] Filed: Dec. 28, 1976

[30] Foreign Application Priority Data

Jan. 14, 1976 United Kingdom ............... 1393/76

[51] Int. Cl.² ........................................... B22D 11/126
[52] U.S. Cl. .................................... 29/527.2; 219/77; 76/112; 29/18; 29/DIG. 40
[58] Field of Search ................. 29/527.2, 527.4, 420.5, 29/DIG. 40; 75/214, 226, 224, 208 CS, 225, 211, 212; 264/111, 121; 76/112

[56] References Cited

U.S. PATENT DOCUMENTS

| 1,701,889 | 2/1929 | Junker ................................. 29/18 |
| 3,089,945 | 5/1963 | Connoy et al. ....................... 76/112 |
| 3,389,993 | 6/1968 | Lund et al. .......................... 29/420.5 |

Primary Examiner—C.W. Lanham
Assistant Examiner—V. Rising
Attorney, Agent, or Firm—Bacon & Thomas

[57] ABSTRACT

A method of manufacturing metallic strip which differs in composition across its width includes feeding a cutting tool continuously into the peripheral surface of a rotating workpiece comprising a plurality of cylindrical components of differing composition to produce a continuous strip peeled from the surface of the workpiece, and collecting the peeled strip by winding it under tension around a coiler.

8 Claims, 2 Drawing Figures

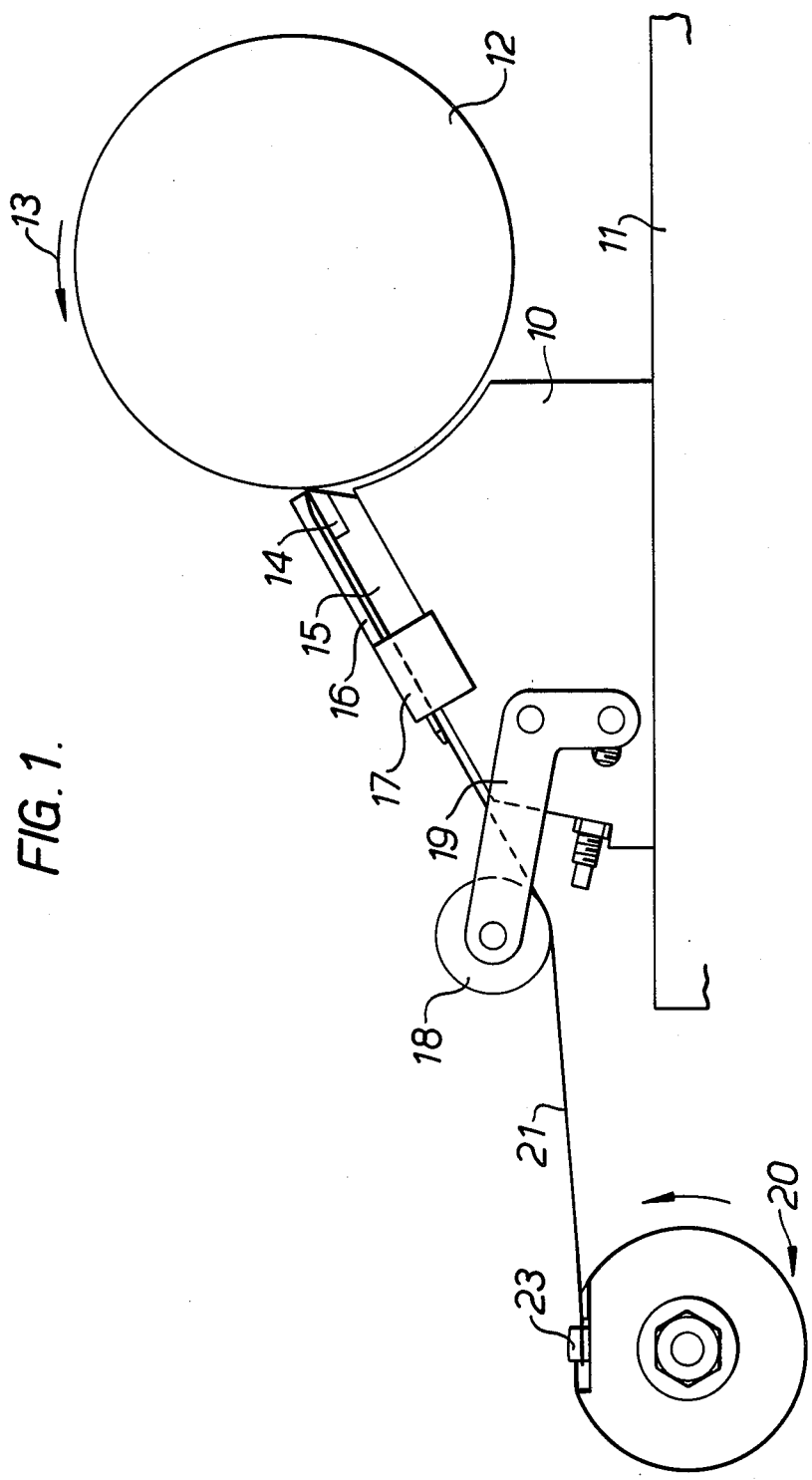

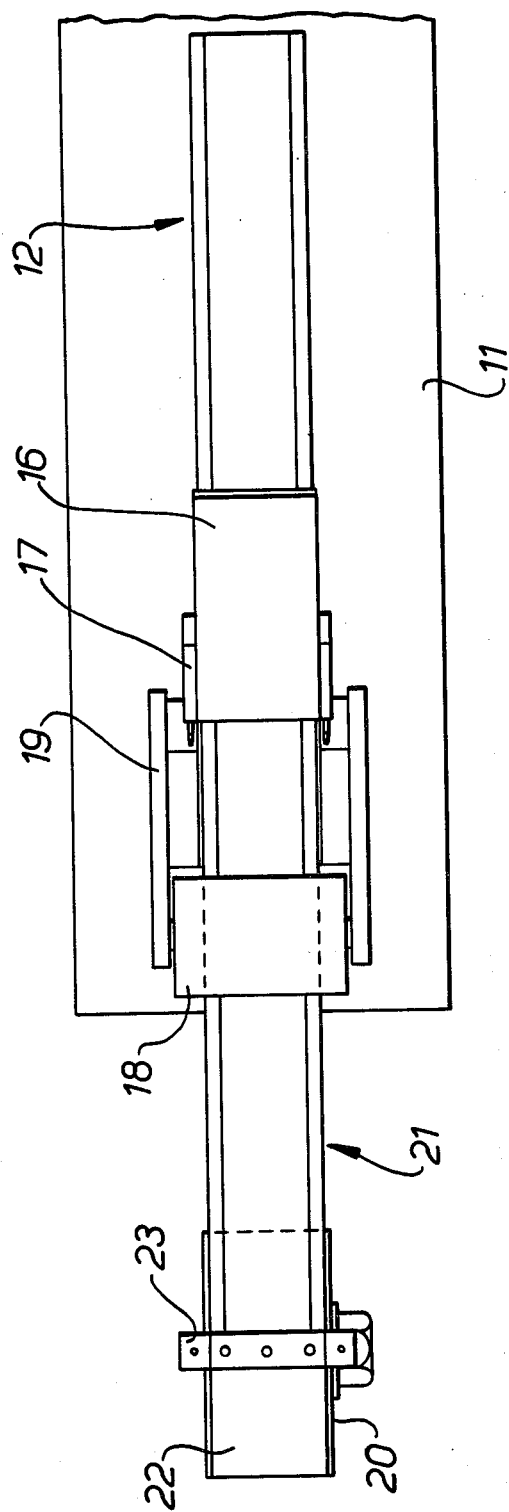

MANUFACTURE OF METALLIC STRIP

This invention relates to the manufacture of metallic strip. In particular it concerns the manufacture of metallic strip which differs in composition across its width.

It has been proposed to produce a particular type of saw blade by electron-beam welding a retangular section high speed steel wire onto the edge of a spring steel backing strip. The product made by this process is alleged to exhibit superior performance characteristics to the conventional high speed steel saw blade, whilst maintaining the high wear resistance required from such products. In particular this proposed new type of saw blade is designed to be far less susceptible to fracture in use than conventional blades. The composite blade is however extremely expensive to manufacture and requires very high accuracy and consistency in its assembly.

According to one aspect of the invention a method of manufacturing metallic strip which differs in composition across its width includes rotating a cylindrical workpiece about its longitudinal axis, feeding a cutting tool continuously into the peripheral surface of the workpiece as it rotates so as to produce a continuous strip peeled from the surface of the workpiece, and collecting the peeled strip by winding it under tension around a coiler, the workpiece comprising a plurality of co-axial cylindrical components of equal diameter, adjacent components being comprised of material of differing composition. The workpiece may be annular in cross-section.

The workpiece may comprise a plurality of cylindrical components of differing composition, each component being bonded to its adjacent component, for example by welding two separate cylindrical components to one another. Alternatively one or more of the components may be deposited as a surface layer on a plane face of an adjacent component. Such a surface layer may be laid down for example by weld deposition, flame spraying, or electro-slag refining techniques, the process being selected to ensure continuity of the interface bond between the components. In a further alternative the workpiece may comprise a single cylinder of uniform composition which has been treated at one of its plane surfaces so as to form a layer of material adjacent said plane surface which differs in composition from the remainder of the workpiece. Examples of surface treatments which might be used to form the cylindrical component forming a surface layer of said workpiece include carburising, nitriding or decarburising. Such techniques are particularly suitable for workpieces which initially have a uniform steel composition.

The workpiece may be subjected to a heat treatment operation prior to the commencement of the strip peeling method.

The workpiece may comprise three co-axial cylindrical components of which the two outer components form surface layers on the central component, and the resultant metallic strip peeled from the peripheral surface of the workpiece may be slit along its length to provide two lengths of metallic strip each of which differs in composition across its width.

The metallic strip peeled from the surface of the workpiece may be subjected to further heat treatment or rolling operations.

According to another aspect of the invention a cylindrical workpiece to be subjected to a cutting tool fed continuously into its peripheral surface as it rotates about its longitudinal axis so as to produce a continuous strip peeled from the surface of the workpiece which differs in composition across its width, consists of a plurality of co-axial cylindrical components of equal diameter, adjacent components being comprised of material of differing composition.

According to a further aspect of the invention, the invention comprehends metallic strip when manufactured by methods hereinbefore described.

An embodiment of the invention will now be described, by way of example only, with reference to the accompanying drawings in which:

FIG. 1 is an end elevation of an apparatus for carrying out the invention, and

FIG. 2 is a plan view of the apparatus of FIG. 1.

A peeling tool holder 10 is supported on a horizontal bed 11. A cylindrical workpiece 12 is mounted for rotation about its longitudinal axis in the direction shown by the arrow 13 in FIG. 1. A drive motor (not shown) is provided for rotating the workpiece 12, the peeling tool holder 10 being driven in a horizontal direction towards the workpiece 12 as the workpiece rotates by a suitable lead screw (not shown) connected through gearing to the said drive motor.

A peeling tool 14 mounted in a tool block 15 is rigidly secured to the peeling tool holder 10 such that the cutting edge of the peeling tool 14 engages the peripheral surface of the workpiece 12. A strip guide plate 16 is held by a guide plate support 17 mounted on the peeling tool holder 10 so that it is spaced a small distance away from and parallel to the upper surface of the tool block 15. The guide plate 16 extends so that it is almost in contact with the surface of the rotatable workpiece 12. An idler roller 18 is mounted on an adjustable arm 19 which is fitted on the peeling tool holder 10, and a coiling drum 20 (which can also be driven from the same drive motor which rotates the workpiece 12) is positioned clear of the horizontal bed 11 with its axis of rotation parallel to that of the workpiece 12.

The leading portion of the peeled strip 21 passes down the gallery formed between the lower surface of guide plate 16 and the upper surface of the tool block 15. The coiling drum drive is then actuated and a guide strip and clamp arrangement (as described in co-pending application Ser. No. 745,559, filed Nov. 29, 1976, is used to grip the leading section of the strip 21 and pull it around the coiling drum 20 at a constant level of tension which ensures that correct strip thickness is maintained even during periods of acceleration. In the accompanying drawings the apparatus is shown in use shortly after start-up. A portion 22 of the guide strip attached to a clamp 23 is shown wound around the coiling drum 20, whilst the leading portion of the peeled strip 21 is gripped by the clamp 23 and is about to be wound around the coiling drum 20. The idler roller 18 ensures that the peeled strip 21 is pulled away from the workpiece 12 at a constant angle irrespective of the changing diameter of the coil of peeled strip accumulating on the coiling drum 20. The apparatus is now run until the section of workpiece 12 which is being peeled is reduced to a small diameter and the machine is then stopped and the tool 14 withdrawn from the workpiece 12.

The workpiece which is peeled consists of three coaxial cylindrical components of equal diameter. The two outer components are of equal thickness (axial length) and both consist of AISI M2 wear resistant high speed steel. The inner component is a cylinder of AISI 6150 low carbon steel which has a high elastic limit coupled with resistance to fracture. Typical dimensions of the workpiece are as follows: overall axial length 28mm, radius 380mm, axial length of each outer cylindrical component 1,5mm, axial length of inner cylindrical component 25mm. Each high speed steel cylinder is laid down on the low carbon steel by weld cladding, flame spraying or electro-slag refining techniques. If necessary the workpiece undergoes a heat treatment and/or hot rolling operation before it is ready for the strip peeling machine.

When the strip 21 is peeled from the workpiece 12 it therefore has a width of 28mm, comprised of two outer portions of high speed steel of 1.5mm width each and a central portion of 25mm width. The thickness of the strip 21 is controlled by the rate of feed of tool 14 together with the tension applied to strip 21 by the coiling drum 20. Following coiling of the peeled strip, the strip 21 can optionally be subjected to a slitting operation, which slits the strip down the centre of its width to produce two strips each having an edge of high speed steel. This strip could then be used as feedstock for the production of composite saw blades.

An alternative form of workpiece has an inner cylindrical component of M2 high speed steel of 3mm axial length, sandwiched between two outer cylindrical components of 6150 low carbon steel, each of 12.5mm axial length. The components may be roll bonded together to form the workpiece. The strip 21 peeled from the alternative form of workpiece is also slit down the centre of its width to produce two strips each having an edge of high speed steel.

The invention may be applied to workpieces made of components of other metallic substances such as titanium, magnesium, tungsten, tantalum, beryllium, copper, nickel or their alloys.

We claim

1. A method of manufacturing metallic strip which differs in composition across its width which method includes the steps of rotating about its longitudinal axis, a cylindrical workpiece comprising a plurality of co-axial cylindrical components of equal diameter, adjacent components being comprised of material of differing composition, feeding a cutting tool continuously into the peripheral surface of the workpiece as it rotates so as to produce a continuous strip peeled from the surface of the workpiece, and collecting the peeled strip by winding it under tension around a coiler.

2. A method as claimed in claim 1 wherein each cylindrical component is bonded to its adjacent component.

3. A method as claimed in claim 2 wherein adjacent components are bonded by welding.

4. A method as claimed in claim 1 wherein one or more of the components is deposited as a surface layer on a plane face of an adjacent component.

5. A method as claimed in claim 4 wherein the surface layer is laid down by weld deposition, flame spraying, or electroslag refining.

6. A method as claimed in claim 1 wherein the workpiece comprises a single cylinder of uniform composition which has been treated at one of its plane surfaces so as to form a layer of material adjacent said plane surface which differs in composition from the remainder of the workpiece.

7. A method as claimed in claim 6 wherein the surface treatment employed to form the cylindrical component forming a surface layer of said workpiece comprises carburising, nitriding, or decarburising.

8. A method as claimed in claim 1 wherein the workpiece comprises three co-axial cylindrical components of which the two outer components form surface layers on the central component and the resultant metallic strip peeled from the peripheral surface of the workpiece is slit along its length to provide two lengths of metallic strip each of which differs in composition across its width.

* * * * *